E. J. Leyburn.
Harvester Rake.

Nº 55877.    Patented Jun. 26, 1866.

Witnesses:    Inventor

E. J. Leyburn.
Harvester Rake.
Nº 55877   Patented Jun. 26, 1866.
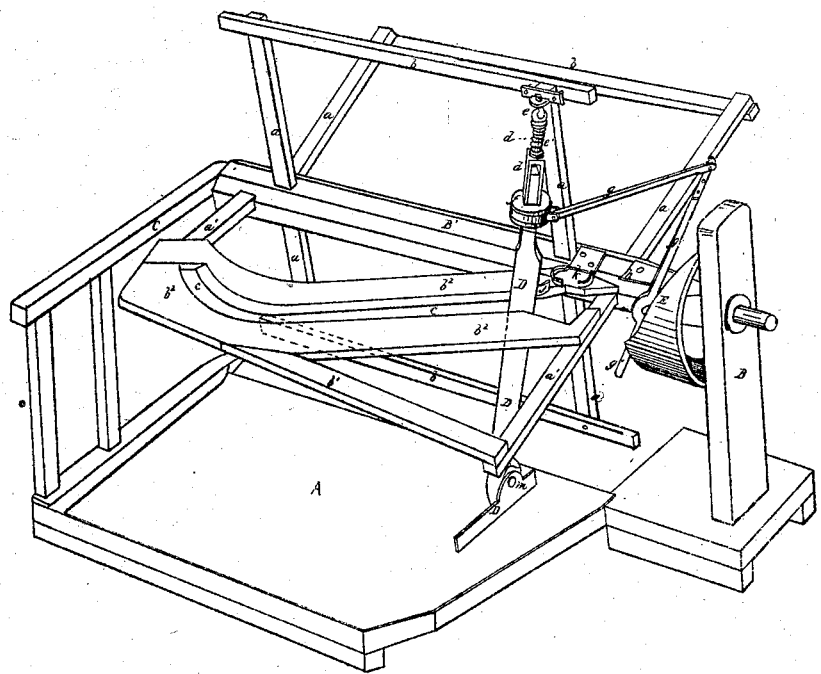
Fig. 6
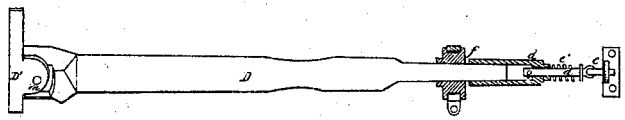
Witnesses:
Inventor:

UNITED STATES PATENT OFFICE.

EDWARD J. LEYBURN, OF LEXINGTON, VIRGINIA.

IMPROVEMENT IN HARVESTER-RAKES.

Specification forming part of Letters Patent No. 55,877, dated June 26, 1866.

*To all whom it may concern:*

Be it known that I, EDWARD J. LEYBURN, of Lexington, in the county of Rockbridge and State of Virginia, have invented a new and Improved Raking Attachment for Harvesters; and I do hereby declare that the following is a full, clear, and exact description thereof, reference being had to the accompanying drawings, making a part of this specification, in which—

Figure 1:
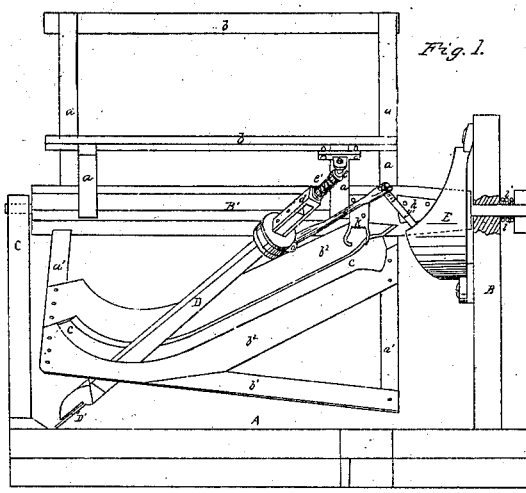
Figure 2:
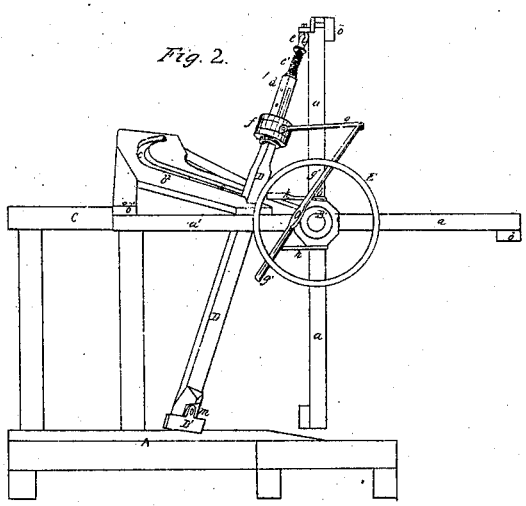
Figure 3:
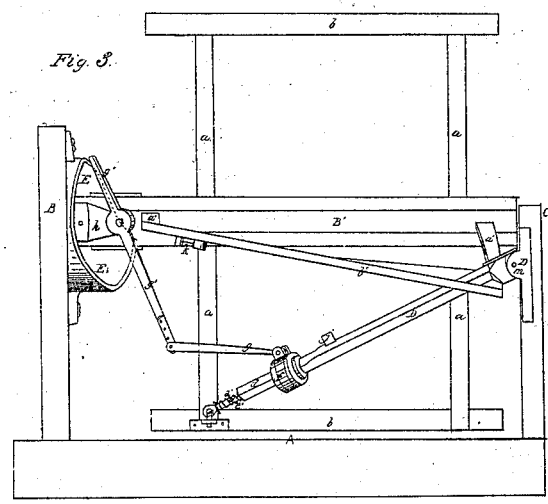
Figure 4:
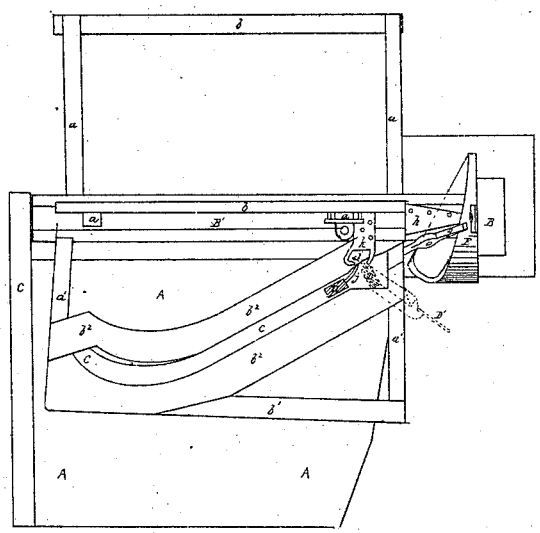

Figure 1 is a rear elevation of the combined rake and reel, showing the former in a position to sweep across the platform. Fig. 2 is an end elevation of the same, showing the rake in a position for delivering a gavel upon the ground in rear of the draft-frame. Fig. 3 is a front elevation of the same, showing the rake in position for allowing its supporting-arms to gather in the standing grain. Fig. 4 is a plan view of the rake and reel, the rake being indicated in red lines, in the same position as is shown in Fig. 2. Fig. 5, Sheet 2, is a perspective view of the rake and reel. Fig. 6, Sheet 2, shows the rake detached from the reel.

Similar letters of reference indicate corresponding parts in the several figures.

The object of this invention is to apply a rake to a revolving reel in such manner that once in every revolution of the reel the rake shall sweep across the platform at, or nearly at, right angles to the line of draft and deliver the gavels upon the ground in rear of the draft-frame; also, to so construct a rake which is applied to a revolving reel that after the rake has made a sweep across the platform it shall move the gavel around so as to deliver it lengthwise to the line of travel, so as to facilitate the handling of the gavels by the person who follows after the machine for the purpose of binding them.

Another object of my invention is to apply a rake to a revolving reel or gatherer in such manner that the rake shall move to the outer side of the reel, nearest the standing grain, and remain in this position during the action of its supporting-arms upon the standing grain, then sweep across the platform and remove the cut grain therefrom, as will be hereinafter described.

To enable others skilled in the art to understand my invention, I will describe its construction and operation.

I have not represented in the drawings any form of transporting-frame or cutting apparatus, for the reason that these parts may be constructed in any of the well-known modes which are adapted for supporting a platform and a reel.

The platform A may be hinged to the draft-frame in any suitable manner which will admit of its adjustment and allow it to rise or fall at its outer end or at both ends, and thus accommodate itself to the undulations of the surface passed over.

The invention may be applied to a combined reaping and mowing machine by making provision for removing the rake and reel attachment, and also the platform, when a mower is desired.

In the drawings, A represents the platform, which may be made of the form shown in Figs. 4 and 5. B represents a post for supporting one end of the reel-shaft B′, and C is a frame which is erected upon the outer end of the platform for sustaining the outer end of said reel-shaft.

The reel consists of a number of radial arms, $a\ a\ a'\ a'$, and transverse pieces $b\ b'$, which serve to gather in the standing grain upon the platform during the cutting operation.

The reel-arms $a'\ a'$ are adapted for sustaining the cross-piece $b^2$, which has an oblique slot, $c$, through it for guiding the rake-staff D. The slot $c$ is straight for a portion of its length, and terminates in a curve at its outer end and in a wide space at its inner end, in which space the rake-staff is allowed to turn partially around, as indicated in red lines, Fig. 4.

The rake-staff D has a metallic loop, $d$, secured to its upper end, through the end of which a short rod, $d'$, passes loosely and receives a pin on its lower end. The upper end of this rod $d'$ has an eye formed on it, which is linked to a swivel-eye, $e$, that is applied to the outer end of the inner reel-arm, $a$, as shown in the drawings. Between the flanged eye of rod $d'$ and the upper end of the loop-piece $d$ a coiled spring, $e'$, is interposed for the purpose of keeping the rake-staff down in a proper position to sweep over the platform and to allow the rake D to yield slightly upward in passing over the platform.

The spring $e'$ will prevent the rake from binding upon the platform while sweeping across it, as it will allow the rake-staff to yield lengthwise.

The manner of connecting the rake-staff to its swivel-pin $e$ is shown clearly in the sectional view, Fig. 6. This connection of the rake will allow it to be vibrated freely and also to oscillate.

There is a small cylinder, $f$, applied fast to the rake-staff near its upper end, having an annular groove formed in its circumference, for receiving a loose collar, to the ends of which a rod, $g$, is pivoted, which rod is again pivoted to the long arm of a vibrating lever, $g'$. This lever is pivoted to the reel-shaft $B'$, and lies across the edge of a face-cam, E, which is secured to the reel-post B in a position which is concentric to the shaft $B'$, as shown in the drawings. The cam E is so shaped and applied to the post B that it will impart a vibrating movement to the lever $g'$ at proper times during the revolution of the reel, which movement will be communicated to the rake-staff D.

The two plates $h\ h$, on opposite sides of the reel-shaft $B'$, are used for supporting the arms of the lever $g'$ and assisting them to resist any strain brought against them by their movement over the irregular surface or edge of the cam E.

The spring $i$, which acts upon the reel-shaft $B'$ to move it endwise toward the post B, is intended for keeping the lever-arms up closely against the edge of cam E. This spring may be dispensed with if desired.

A projection, $j$, is applied to the rake-staff D, as shown in Figs. 3, 4, and 5, in a proper position to be caught between the curved prongs of a plate, $k$, on the reel-shaft, and to allow these prongs to turn the rake-staff one-quarter around, more or less, just before the rake terminates its raking stroke across the platform.

The operation of the cam E upon the lever $g'$ is, as before stated, to give an intermittent vibrating movement to the rake-staff as the reel is revolved. The movement of the lower end of the rake-staff across the platform is governed by the oblique slot C through the cross-piece $b^2$ of the reel-arms $A'\ A'$, and the rake $D'$ is brought down upon the platform at the outer end thereof, and drawn across the same nearly in a line which is parallel to the finger-beam, or at right angles to the line of draft.

When the rake nearly reaches the point of delivery for the gavel the projection $j$ is caught by the forked plate $k$ and the rake is turned nearly one-quarter round, so as to leave the gavel across the path behind the draft-frame, as indicated in Figs. 2 and 4. The rake now rises with its reel, and when it arrives at a proper position it will be thrown across the reel to the position indicated in Fig. 3, in which position it descends and moves backward until it again reaches the position shown in Fig. 1, when the cam E will cause it to sweep across the platform, guided by its slot $c$, and deliver its gavel, as before described.

During the gathering-sweep of the arms, to which the slotted cross-piece $b'$ is applied, the rake $D'$ will be at the extreme outer end of this piece $b'$, out of the way of standing grain, and the rake will follow behind this piece and rake off the cut grain. There need not be any cessation of the motion of the reel on account of the rake being attached to it.

All the mechanism for moving the rake is applied within the circle described by the outer ends of reel-arms, and consequently there will not be anything in the way of the standing grain to become tangled therewith. The rake D is applied to the lower end of the staff D by means of a pivot, $m$, so that the lower edge of the rake shall accommodate itself to and move parallel with the surface of the platform; and the rake-staff is made flat, so that its slotted guide $c$ will keep the rake at right angles, or nearly so, to the finger-beam, as the former sweeps across the platform and is turned by the projection $j$ and forked plate $k$.

I am aware that a rake and a revolving reel have been combined before my invention, and I do not therefore desire to claim, broadly, a rake and reel combined.

I am not aware, however, that a rake has ever been applied to a reel in such manner that the rake turns with the reel and then sweeps directly across the platform; nor am I aware that a rake operating upon the principle of the rake herein set forth has ever been applied to a reel so as to receive its motion directly there from.

Having thus described my invention, what I claim as new, and desire to secure by Letters Patent, is—

1. Combining a rake with a revolving reel in such manner that the rake shall receive a rectilinear movement across the platform at every revolution of the reel, and without stopping the movement of the latter, substantially as described.

2. Supporting and guiding a rake-staff, D, by means of a revolving reel, in such manner that the rake shall revolve with the reel after the termination of each raking stroke, and then move across the platform in a line which is at right angles, or nearly so, to the line of draft, substantially as described.

3. Supporting and guiding the rake-staff by means of a slotted cross-piece, $b^2$, applied to the reel and arranged so that the rake $D'$ shall be held at right angles to the finger-beam in its passage across the platform, substantially as described.

4. A rake which is applied to a revolving reel and moves in a right or nearly right line across the platform, in combination with means which finally discharge or deliver the gavels of grain with their length at right angles, or nearly so, to the path of the machine, and also out of the return track of the horses, substantially as described.

5. A rake which moves in a right or nearly right line across the platform, so pivoted to the reel that it is capable of swiveling and vibrating, substantially as herein described.

6. In combination with a revolving reel and vibrating rake, pivoting the rake to its staff, substantially as described.

7. Providing for moving the rake to the outer end of the reel previously to the action of the guide-arm $b'$ upon the standing grain, substantially as described.

8. The rake pivoted to the reel so as to revolve with it, constructed and controlled substantially in the manner and for the purpose described.

EDWARD J. LEYBURN.

Witnesses:
J. W. BARCLAY,
A. W. CAMERON.